United States Patent [19]

Ogawa

[11] Patent Number: 5,748,572
[45] Date of Patent: May 5, 1998

[54] MAGNETO-OPTICAL RECORDING APPARATUS WITH AN OPTICAL ELEMENT PROVIDING A HIGH C/N RATIO

[75] Inventor: Masatsugu Ogawa, Tokyo, Japan

[73] Assignee: NEC Corporation, Japan

[21] Appl. No.: 590,123

[22] Filed: Jan. 23, 1996

[30] Foreign Application Priority Data

Jan. 23, 1995 [JP] Japan ................................. 7-008016

[51] Int. Cl.⁶ ............................. G11B 11/00; G11B 7/24
[52] U.S. Cl. ......................... 369/13; 369/275.1; 369/109
[58] Field of Search .............................. 369/13, 275.1, 369/109, 275.3, 110, 116, 15, 103, 44.37, 44.32, 44.38; 360/59

[56] References Cited

U.S. PATENT DOCUMENTS 5,161,133   11/1992   Levenson ............................. 369/13
5,570,338   10/1996   Toda et al. ........................ 369/275.1

FOREIGN PATENT DOCUMENTS 60-89620   6/1985   Japan .

OTHER PUBLICATIONS

"Multichannel Operation of an Integrated Acousto–Optic Wavelength Routing Switch for WDM Systems" D'Alessandro et al; IEEE Photonics Technology Letters; Mar. 1994; pp. 390–393.

"Acousto–Optice Tunable Filter" Harris et al; Journal of the Optical Society of America, vol. 59, No.6; Jun. 1969; pp. 744–747.

Primary Examiner—Ali Neyzari
Attorney, Agent, or Firm—Hayes, Soloway, Hennessey, Grossman & Hage, P.C.

[57] ABSTRACT

An optical element for a magneto-optical recording apparatus which has a light receiving face on which light is incided, this light being reflected or transmitted on or through a magneto-optical recording medium and a mask for masking a part of the light receiving face, wherein the inciding light is partially masked by the mask. Also, a method for reproducing information from a magneto-optical recording medium which has the steps of: inciding light that is reflected or transmitted on or through the magneto-optical recording medium through an optical system into an optical detector; and reproducing the information according to a signal generated by the optical detector; wherein an optical element of the optical system or the optical detector is provided with the mask.

7 Claims, 5 Drawing Sheets

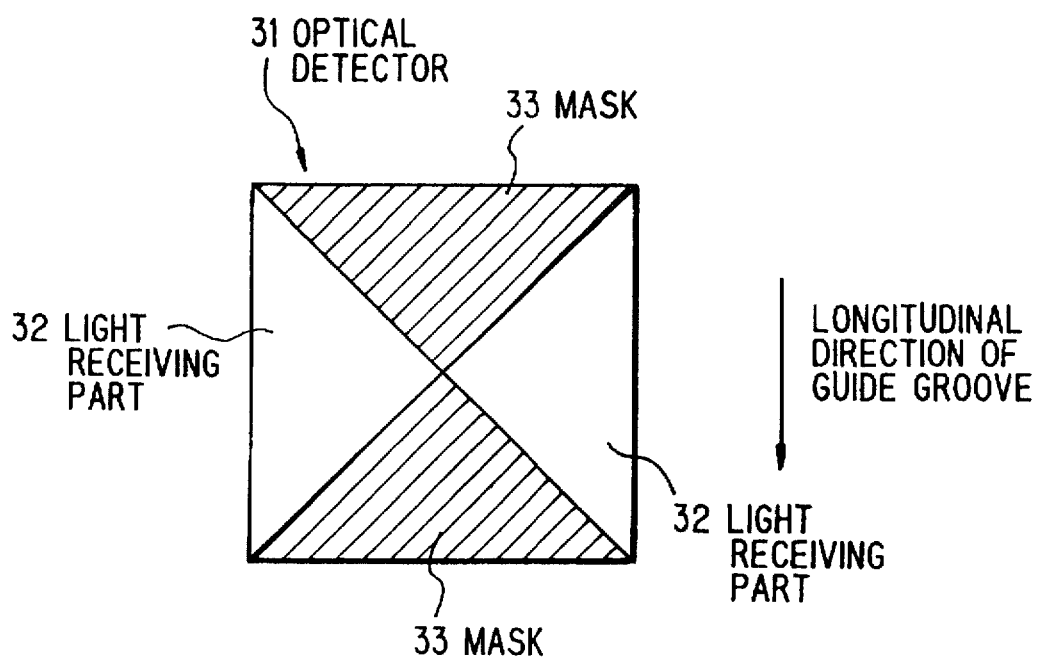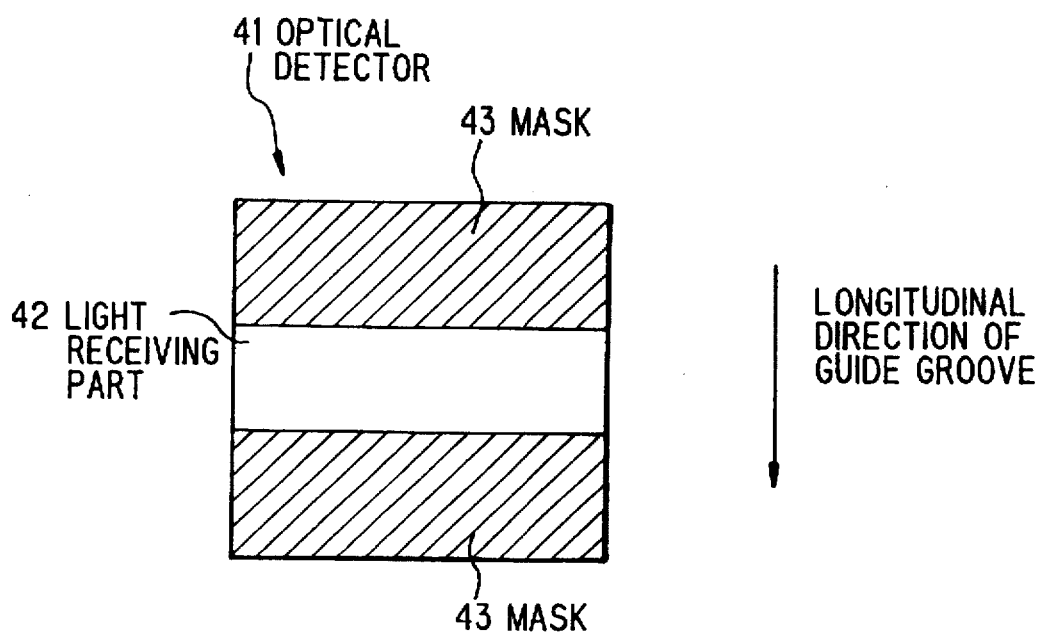

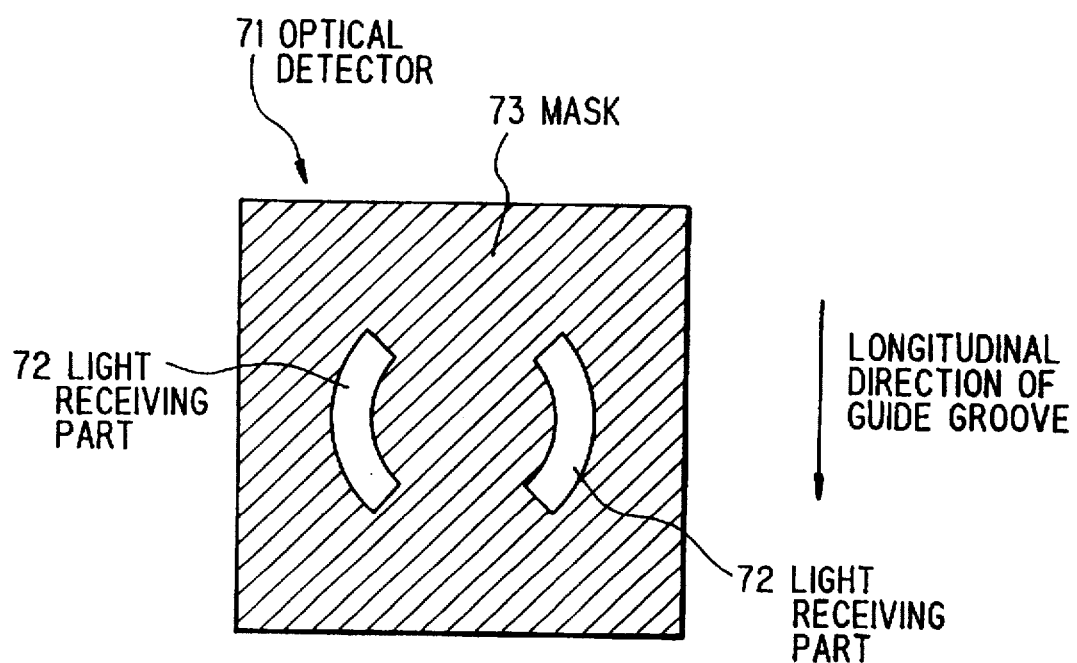

MAGNETO-OPTICAL RECORDING APPARATUS WITH AN OPTICAL ELEMENT PROVIDING A HIGH C/N RATIO

FIELD OF THE INVENTION

This invention relates to an optical element for a magneto-optical recording apparatus and a method for reproducing information from a magneto-optical recording medium.

BACKGROUND OF THE INVENTION

In general, to reproduce information recorded on a magnetic film of magneto-optical recording medium as the change of magnetization direction, polarized light is incided on the magneto-optical recording medium and the polarized plane component of the reflected light, which is generated by Kerr effect, is rotated with the magnetization direction and is differentially detected. However, the Kerr rotation angle obtained in the light that is reflected or transmitted on or through the magneto-optical recording medium is about 0.2 degree at the most. Therefore, it is difficult to get a high carrier-to noise ratio (C/N ratio) by only the magneto-optical recording film (magnetic film). To increase the Kerr rotation angle, a magneto-optical recording medium with reflection film or dielectric film is used.

Recently, the wavelength of laser light is shorter with the increase of recording density, thereby causing the decease in the Kerr rotation angle to reduce the C/N ratio. The decrease in the length of a recording mark resulting from the increase in the recording density also interferes with getting a high C/N ratio.

Japanese utility model application laid-open No. 60-89620 and Japanese patent application laid-open No. 63-193334 disclose methods for increasing a C/N ratio. In these methods, since the reflected light from the magneto-optical recording medium is subject to an unnecessary rotation near the circumference of a lens to transmit the light, the circumferential portion of the light receiving face of an optical detector is scraped down and the central portion thereof is left. In contrast, in the instant invention, the light receiving face is formed such that it keeps the same configuration after it is rotated 90 degrees around the center of the light receiving face, i.e., to get four-time symmetry.

However, when light is vertically incided on the surface of a magneto-optical recording medium 100 as shown in FIG. 1B, the relation of a scattering angle and a Kerr rotation angle on the x-z plane that is formed in the direction of the width of a guide groove 101 is as shown with a line I in FIG. 1A, and the relation of a scattering angle and a Kerr rotation angle on the y-z plane that is formed in the direction of the length of the guide groove 101 is as shown with a dotted line II in FIG. 1A. Namely, it will be appreciated that the Kerr rotation angle in the scattering light on the magneto-optical recording medium 100 is varied depending on the direction of scattering and does not show the four-time symmetry.

On the other hand, it will be also appreciated that the Kerr rotation angles are not biggest to the scattering angle of 90° where the direction of scattering corresponds to the direction of incidence of the light. Accordingly, it is difficult for the above conventional methods to sufficiently improve the C/N ratio. Moreover, in the conventional methods, since the light receiving face of an optical detector itself needs to be formed into various shapes, the manufacturing process is complicated.

SUMMARY OF THE INVENTION

Accordingly, it is an object of the invention to provide an optical element for a magneto-optical recording apparatus which can improve the C/N ratio to a high-density magneto-optical recording medium.

It is a further object to provide an optical element for a magneto-optical recording apparatus which can be easily manufactured.

It is a still further object to provide a method for reproducing information from a magneto-optical recording medium in which a high C/N ratio can be obtained.

Accordingly the present invention provides an optical element for a magneto-optical recording apparatus, comprising:

a light receiving face on which light that is reflected or transmitted on or through a magneto-optical recording medium is incided; and a mask for masking a part of the light receiving face;

wherein the inciding light is partially masked by the mask.

Herein, the mask may be formed such that it has a different configuration after the mask is rotated 90 degrees around a center of the light receiving face and that a component of the inciding light with a small Kerr rotation angle is effectively masked. Also, the mask may be formed such that the light receiving face is masked to leave an area formed between two similar figures which have a common center and different sizes. Further, the mask may be formed such that the light receiving face is masked to leave two arc areas, each of which being symmetrically disposed to a center line of the light receiving face in parallel with a guide groove on the magneto-optical recording medium and having a width.

The optical element according to the present invention is an optical detector for reproducing information from the magneto-optical recording medium, a polarization beam splitter or a ½ wavelength plate.

According to another aspect of the invention, a method for reproducing information from a magneto-optical recording medium, comprising the steps of:

inciding light that is reflected or transmitted on or through the magneto-optical recording medium through an optical system into an optical detector; and reproducing the information according to a signal generated by the optical detector;

wherein an optical element of the optical system or the optical detector is provided with a mask as mentioned above.

In accordance with the optical element for a magneto-optical recording apparatus, a component of the inciding light with a small Kerr rotation angle as shown in FIG. 1A is effectively masked by the mask provided on the optical element.

As shown in FIG. 1B, the longitudinal direction of a guide groove 101 is in the y direction, the width direction of the guide groove 101 is in the x direction and the depth direction of the guide groove 101 is the z direction. The scattering angle of 90° in FIG. 1A corresponds to the direction of incidence of light. As shown in FIG. 1A, the scattering characteristics on the x-z plane and the y-z plane are different one another. Further, on the x-z plane, the Kerr rotation angle is discontinuously increased in the range of the scattering angles of 50° to 60°.

In general, when all the reflected light from a magneto-optical recording medium is incided on the optical detector, an effective Kerr rotation angle is decreased since the reflected light includes light with a relatively small Kerr rotation angle as shown in FIG. 1A. As a result, the decrease in the effective Kerr rotation angle leads to the reduction in a C/N ratio.

The conventional techniques in which the light receiving part of the optical detector is formed to remove the unnecessary rotation near the circumference of the lens do not consider that the scattering light from the magneto-optical recording medium itself has anisotropy to Kerr rotation angle as in FIG. 1A. Therefore, it is difficult for them to sufficiently improve the C/N ratio.

To effectively obtain a bigger Kerr rotation angle, the incident light with a relatively small Kerr rotation angle on the basis of the scattering characteristic in FIG. 1A should not be detected. Namely, light in an axis direction, i.e., y axis direction in the scattering characteristic in FIG. 1A, should not be detected and light with a scattering angle should be mainly detected.

As explained above, in the optical element for a magneto-optical recording apparatus of the present invention, a component of the inciding light with a small Kerr rotation angle, as shown in FIG. 1A, is effectively masked by the mask provided on the optical element to obtain a high C/N ratio. Herein, it should be noted that the scattering characteristic in FIG. 1A is an example. When the shape of the groove is changed, the Kerr rotation angle to scattering angle characteristic will be changed. Therefore, the shape of the masking means should be optimized based on the characteristic.

On the other hand, in the optical element for a magneto-optical recording apparatus of the invention, the manufacturing process is facilitated and the production yield is improved compared with the conventional optical elements since the masking means are formed on the optical element. Furthermore, the optical element according to invention includes a polarization beam splitter, ½ wavelength plate and the like, on which the masking means are more easy to be formed since the their sizes are bigger than an optical detector.

BRIEF DESCRIPTION OF THE DRAWINGS

The invention will be explained in more detail in conjunction with the appended drawings, wherein:

FIG. 4 is a plan view showing an optical element for a magneto-optical recording apparatus in a second preferred embodiment according to the invention;

FIG. 5 is a plan view showing an optical element for a magneto-optical recording apparatus in a third preferred embodiment according to the invention;

FIG. 8 is a plan view showing an optical element for a magneto-optical recording apparatus in a sixth preferred embodiment according to the invention.

DESCRIPTION OF THE PREFERRED EMBODIMENTS

An optical element for a magneto-optical recording apparatus in the first preferred embodiment will be explained with reference to FIG. 2. An optical detector 11 has a light receiving part 12, a part of which is masked by a mask 13. The light receiving part 12 is similar to that in a known optical detector. The mask 13 is, for example, made of aluminum and is formed such that a portion except two semicircles which are respectively centered at positions which are symmetrical to a center line of the light receiving part 12 that is parallel with a longitudinal direction of guide grooves of a magneto-optical recording medium is masked. The mask 13 is, for example, formed by the aluminum film deposition using a mask.

Figure 2:
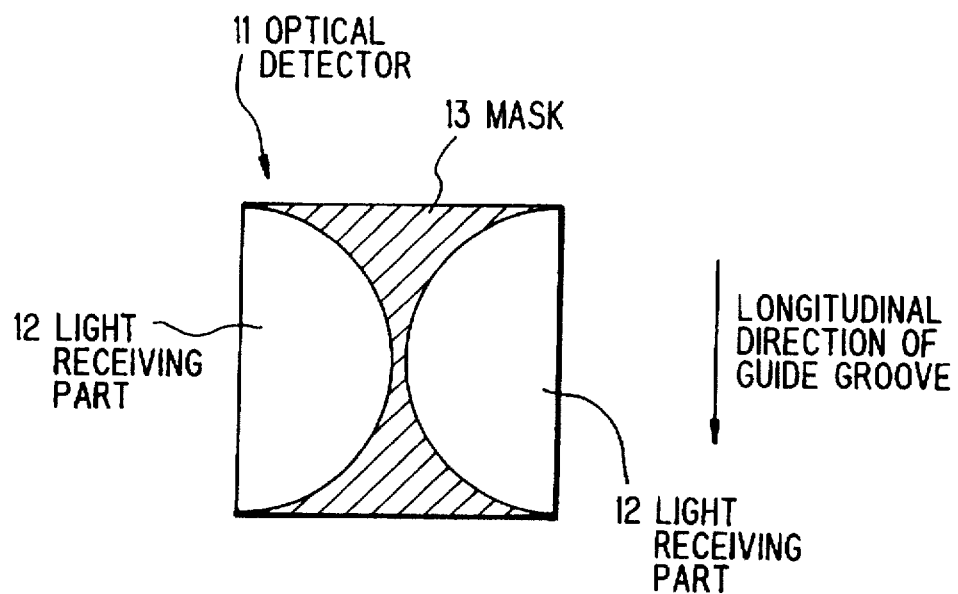
FIG. 2 is a plan view showing an optical element for a magneto-optical recording apparatus in a first preferred embodiment according to the invention.
Figure 3:
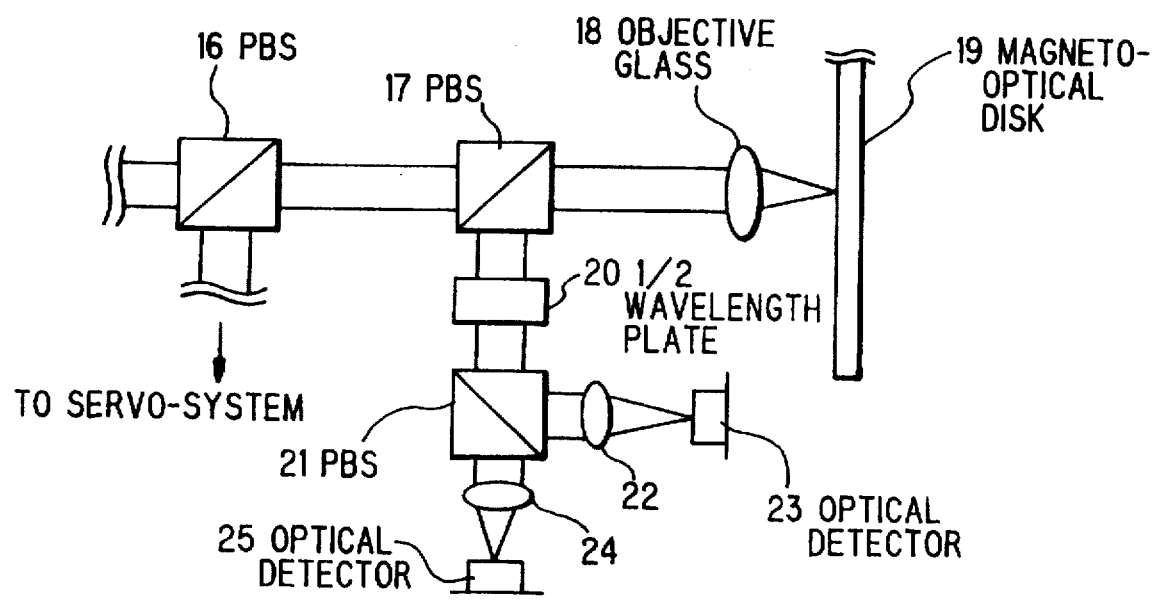
FIG. 3 is a schematic diagram showing an example of an optical system in which a method for reproducing information on a magneto-optical recording medium according to the invention is carried out.

FIG. 3 shows an example of an optical system in which a method for reproducing information on a magneto-optical recording medium according to the invention is carried out, which can employ the above optical detector 11. The optical system which is used for a magneto-optical disk comprises polarization beam splitters (PBS's) 16 and 17, an objective glass 18, magneto-optical disk 19, ½ wavelength plate 20, PBS 21, lenses 22 and 24 and optical detectors 23 and 25. The optical detector 11 in FIG. 2 can be employed as the optical detectors 23 and 25.

In operation, laser light emitted from a light source (not shown) is transmitted through PBS's 16 and 17 and then is incided into the objective glass 18 to be focused. The focused laser light forms an image as a light spot on the magneto-optical disk 19 and is reflected thereon. Herein, since some information is recorded as the changes of magnetization direction on the magnetic film of the magneto-optical disk 19, the polarization plane of the reflected light is rotated by Kerr effect according to the magnetization direction.

The reflected light is incided through the objective glass 18 into PBS 17 where a part of the reflected light is reflected and the remainder is transmitted to be incided on PBS 16. The light component reflected on PBS 17, the polarization plane of which is rotated 45 degrees by the ½ wavelength plate 20, is incided PBS 21. At PBS 21, a part of the light is reflected and transmitted through the lens 22 and incided into the optical detector 23, the remainder is transmitted through the lens 24 and incided into the optical detector 25. The incided light is subject to photoelectric conversion by the respective optical detectors 23 and 25. The photoelectric conversion signals are differentially detected to reproduce the information recorded on the magneto-optical disk 19. Focusing and tracking signals are produced at a servo-system (not shown) on the basis of the light component reflected at PBS 16.

Figure 1A:
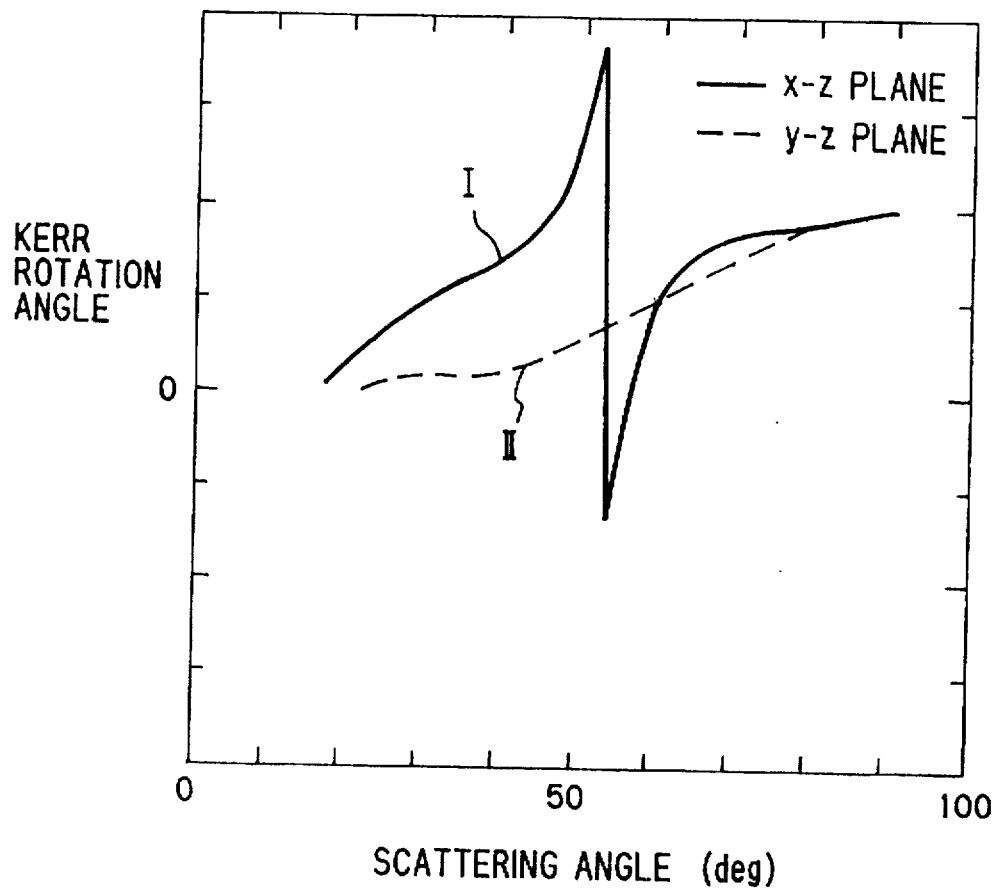
FIG. 1A is a graph showing a characteristic of a Kerr rotation angle and a scattering angle.
Figure 1B:
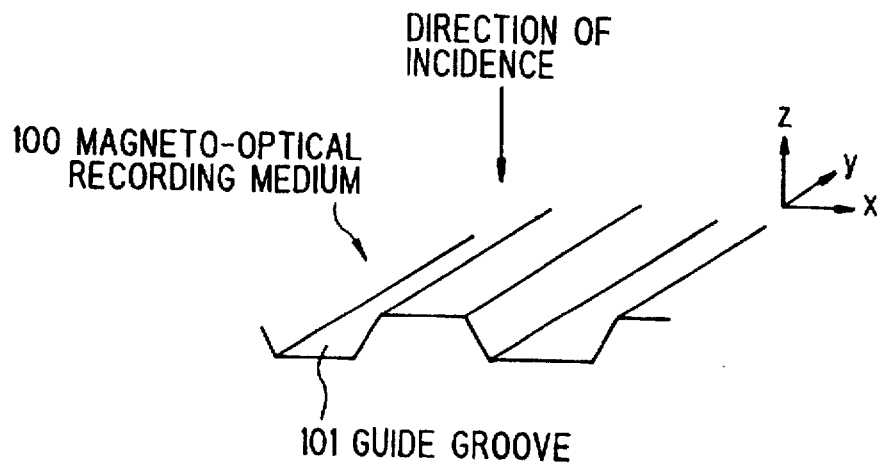
FIG. 1B is a partial enlarged view showing the surface of a magneto-optical recording medium.

The optical detectors 23 and 25 which are formed as the optical detector 11 in FIG. 2 are disposed as shown in FIG. 2 to the longitudinal direction of the guide groove of magneto-optical disk 19. Therefore, the reflected light component with a relatively small Kerr rotation angle as shown in FIG. 1A can be masked and the reflected light component at the scattering plane with a relatively big Kerr rotation angle can be received by the optical detectors 23 and 25. As a result, the carrier-to-noise ratio (C/N ratio) can be improved.

As an example, the magneto-optical disk 19 can be a medium in which magnetic film with a track pitch of 1.2 µm is formed on a polycarbonate substrate and on which information is recorded with a recording mark length of 3 µm. The wavelength of laser light for reproduction is 680 nm, and the linear speed of the magneto-optical disk 19 is 6 m/s. The C/N ratio of the reproduction signal in the optical detector according to the above embodiment is 60 dB, while the C/N ratio in the conventional optical detector which does not have a mask is 58 dB. As a result, the C/N ratio can be improved 2 dB.

An optical element for a magneto-optical recording apparatus in the second preferred embodiment will be explained with reference to FIG. 4. As shown in FIG. 4, an optical detector 31 of the optical element is formed such that a means of a light receiving part 32 is masked by a mask 33. The light receiving means 32 is similar to that in a known optical detector.

The mask 33 is, for example, made of aluminum and is formed such that upper and lower triangular sections formed by two intersecting diagonal lines in the square light receiving means 32 are masked. The mask 33 is, for example, formed by the aluminum film deposition using a mask.

The optical detectors 23 and 25 in FIG. 3 which are formed as the optical detector 31 are disposed as shown in FIG. 4 to the longitudinal direction of the guide groove of magneto-optical disk 19. Therefore, the reflected light component with a relatively small Kerr rotation angle as shown in FIG. 1A can be masked and the reflected light component at the scattering plane with a relatively big Kerr rotation angle can be received by the optical detectors 23 and 25. As a result, the carrier-to-noise ratio (C/N ratio) can be improved.

As an example, is the magneto-optical disk 19 can be a medium in which magnetic film with a track pitch of 1.2 µm is formed on a polycarbonate substrate and on which information is recorded with a recording mark length of 3 µm. The wavelength of laser light for reproduction is 680 nm, and the linear speed of the magneto-optical disk 19 is 6 m/s. The C/N ratio of the reproduction signal in the optical detector according to the above embodiment is 60 dB, while the C/N ratio in the conventional optical detector which does not have a mask is 58 dB. As a result, the C/N ratio can be improved 2 dB.

An optical element for a magneto-optical recording apparatus in the third preferred embodiment will be explained with reference to FIG. 5. As shown in FIG. 5, an optical detector 41 of the optical element is formed such that a part of a light receiving part 42 is masked by a mask 43. The light receiving means 42 is similar to that in a known optical detector.

The mask 43 is, for example, made of aluminum and is formed such that upper and lower rectangular sections of three equal sections divided horizontally by two parallel lines in the square light receiving means 42 are masked. The mask 43 is, for example, formed by the aluminum film deposition using a mask.

The optical detectors 23 and 25 in FIG. 3 which are formed as the optical detector 41 are disposed as shown in FIG. 5 to the longitudinal direction of the guide groove of magneto-optical disk 19. Therefore, the reflected light component with a relatively small Kerr rotation angle as shown in FIG. 1A can be masked and the reflected light component at the scattering plane with a relatively big Kerr rotation angle can be received by the optical detectors 23 and 25. As a result, the carrier-to-noise ratio (C/N ratio) can be improved similarly to the second embodiment.

Figure 6:
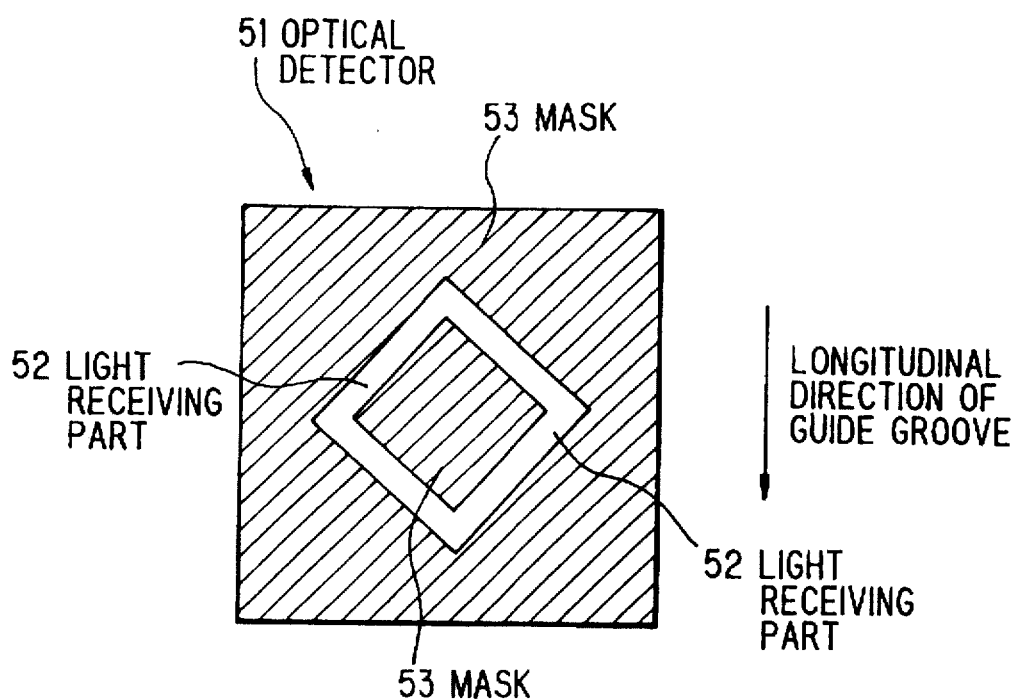
FIG. 6 is a plan view showing an optical element for a magneto-optical recording apparatus in a fourth preferred embodiment according to the invention.

An optical element for a magneto-optical recording apparatus in the fourth preferred embodiment will be explained with reference to FIG. 6. As shown in FIG. 6, an optical detector 51 of the optical element is formed such that a means of a light receiving part 52 is masked by a mask 53. The light receiving means 52 is similar to that in a known optical detector.

The mask 53 is, for example, made of aluminum and is formed such that the square light receiving means 52 is masked to leave a rhombi annular section which is formed between an inner smaller rhombic section and an outer bigger rhombi section which have the same center as the square light receiving means 52. The mask 53 is, for example, formed by the aluminum film deposition using a mask.

The optical detectors 23 and 25 in FIG. 3 which are formed as the optical detector 51 are disposed as shown in FIG. 6 to the longitudinal direction of the guide groove of magneto-optical disk 19. Therefore, the reflected light component with a relatively small Kerr rotation angle as shown in FIG. 1A can be masked and the reflected light component at the scattering plane with a relatively big Kerr rotation angle can be received by the optical detectors 23 and 25. As a result, the carrier-to-noise ratio (C/N ratio) can be improved similarly to the second and third embodiments.

Figure 7:
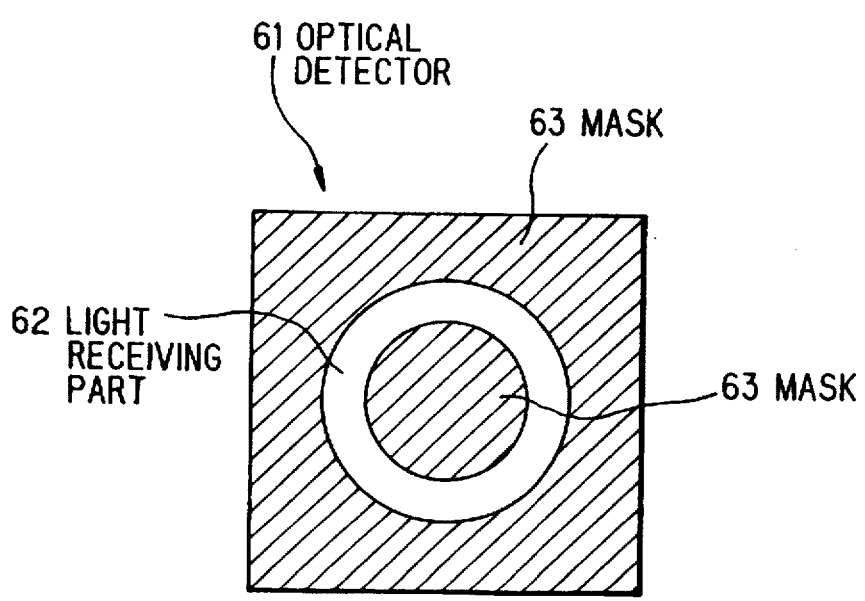
FIG. 7 is a plan view showing an optical element for a magneto-optical recording apparatus in a fifth preferred embodiment according to the invention.

An optical element for a magneto-optical recording apparatus in the fifth preferred embodiment will be explained with reference to FIG. 7. As shown in FIG. 7, an optical detector 61 of the optical element is formed such that a part of a light receiving part 62 is masked by a mask 63. The light receiving means 62 is similar to that in a known optical detector.

The mask 63 is, for example, made of aluminum and is formed such that the square light receiving means 62 is masked to leave a ring section which is formed between an inner smaller circular section and an outer bigger circular section which have the same center as the square light receiving part 62. The mask 63 is, for example, formed by the aluminum film deposition using a mask.

The optical detectors 23 and 25 in FIG. 3 which are formed as the optical detector 61 are disposed as shown in FIG. 7 to the longitudinal direction of the guide groove of magneto-optical disk 19. Therefore, the reflected light component with a relatively small Kerr rotation angle as shown in FIG. 1A can be masked and the reflected light component at the scattering plane with a relatively big Kerr rotation angle can be received by the optical detectors 23 and 25. As a result, the carrier-to-noise ratio (C/N ratio) can be improved similarly to the second to fourth embodiments.

An optical element for a magneto-optical recording apparatus in the sixth preferred embodiment will be explained with reference to FIG. 8. As shown in FIG. 8, an optical detector 71 of the optical element is formed such that a part of a light receiving part 72 is masked by a mask 73. The light receiving means 72 is similar to that in a known optical detector.

The mask 73 is, for example, made of aluminum and is formed such that the square light receiving means 72 is masked to leave arc sections which are symmetrically disposed to the center line of the square light receiving means 72. The mask 73 is, for example, formed by the aluminum film formation using a mask for the film formation.

The optical detectors 23 and 25 in FIG. 3 which are formed as the optical detector 71 are disposed as shown in FIG. 8 to the longitudinal direction of the guide groove of magneto-optical disk 19, where the scattering angle of the reflected light component becomes smaller according as the arc sections are away from the center of the square light receiving means 72. Therefore, only the reflected light component at the scattering plane (where scattering angle is a little over 50 degrees) with the biggest Kerr rotation angle as shown with the line I in FIG. 1A can be received by the optical detectors 23 and 25. As a result, the carrier-to-noise ratio (C/N ratio) can be improved.

As an example, the magneto-optical disk 19 can be a medium in which magnetic film with a track pitch of 1.2 µm is formed on a polycarbonate substrate and on which information is recorded with a recording mark length of 3 μm. The wavelength of laser light for reproduction is 680 nm, and the linear speed of the magneto-optical disk 19 is 6 m/s. The C/N ratio of the reproduction signal in the optical detector according to the above embodiment is 61 dB, while the C/N ratio in the conventional optical detector which does not have a mask is 58 dB. As a result, the C/N ratio can be improved 3 dB.

Though the light receiving means 72 of the optical detector 71 comprises two arc sections, even any one of them can function similarly.

The mask in the above embodiments may be made of titanium, aluminum-titanium alloys or the like with a large reflectivity, or magnetic film etc. with high absorption coefficient other than aluminum. The shape of the mask is not limited to that in FIGS. 2 and 4 to 8. Namely, any shape that can mask the reflected light component with a relatively small Kerr rotation angle may be employed. Meanwhile, the masks as shown in FIGS. 2, 4, 5 and 8 are formed not to be provided with 90° (four-time) rotational symmetry. However, another mask with a shape other than the above can also mask the reflected light component with a relatively small Kerr rotation angle without departing from the scope of the present invention.

The optical elements in the above embodiments are explained as the optical detectors. However, the other optical elements, for example, ½ wavelength plate 20, PBS 21 or lenses 22 and 24 in FIG. 3, may also be provided with the same masks in the above embodiments to mask the reflected light component with a relatively small Kerr rotation angle to improve the C/N ratio. Furthermore, the optical element according to the invention can be also adapted to the light transmitted through a magneto-optical recording medium.

On the other hand, the optical system for reproducing a signal from an magneto-optical recording medium is not limited to that in FIG. 3 and may include another optical element that corresponds to ½ wavelength plate or PBS.

Although the invention has been described with respect to specific embodiment for complete and clear disclosure, the appended claims are not to be thus limited but are to be construed as embodying all modification and alternative constructions which fairly fall within the basic teaching here is set forth.

What is claimed is:

1. An optical element for a magneto-optical recording apparatus, comprising:

a light receiving face for receiving incided light thereon, said incided light being reflected or transmitted on or through a magneto-optical recording medium; and a mask for masking a part of said light receiving face, said mask being formed such that it has a different configuration after being rotated 90 degrees around a center of said light receiving face and that a component of said inciding light with a small Kerr rotation angle is effectively masked, said light receiving face being masked to leave two arc areas, each of which is symmetrically disposed to a center line of said light receiving face in parallel with a guide groove on said magneto-optical recording medium and having a width, and wherein said incided light is partially masked by said mask.

2. An optical element for a magneto-optical recording apparatus, according to claim 1, wherein:

said mask is formed such that said light receiving face is masked to leave an area formed between two similar figures which have a common center and different sizes.

3. An optical element for a magneto-optical recording apparatus, according to claim 1, wherein:

said optical element is an optical detector for reproducing information from said magneto-optical recording medium, said optical detector comprising a light receiving part on which light that is reflected or transmitted on or through said magneto-optical recording medium is incided and said mask formed on said light receiving part.

4. An optical element for a magneto-optical recording apparatus, according to claim 1, wherein:

said optical element is a polarization beam splitter, said polarization beam splitter comprising a light receiving face on which light that is reflected or transmitted on or through said magneto-optical recording medium is incided and said mask formed on said light receiving face.

5. An optical element for a magneto-optical recording apparatus, according to claim 1, wherein:

said optical element is ½ wavelength plate, said ½ wavelength plate comprising a light receiving face on which light that is reflected or transmitted on or through said magneto-optical recording medium is incided and said mask formed on said light receiving face.

6. A method for reproducing information from a magneto-optical recording medium, comprising the steps of:

providing an optical recording element having a light receiving face;

masking a part of said light receiving face using a mask which is formed such that it has a different configuration after being rotated 90 degrees around a center of said light receiving face and that a component of said inciding light with a small Kerr rotation angle is effectively masked;

rotating said mask 90 degrees around a center of said light receiving face;

masking said light receiving face whereby to leave two arc areas, each of which is symmetrically disposed to a center line of said light receiving face in parallel with a guide groove on said magneto-optical recording medium and having a width;

inciding light that is reflected or transmitted on or through said magneto-optical recording medium through an optical system into an optical detector; and reproducing said information according to a signal generated by said optical detector.

7. A method according to claim 8, wherein said masking of said light receiving face leaves an area formed between two similar figures which have a common center and different sizes.

* * * * *